US005589216A

United States Patent [19]
Guskey et al.

[11] Patent Number: 5,589,216
[45] Date of Patent: *Dec. 31, 1996

[54] REDUCED CALORIE CONFECTIONERY COMPOSITIONS WHICH CONTAIN REDUCED CALORIE FATS WHICH EXHIBIT RAPID TRANSFORMATION TO BETA PHASE

[75] Inventors: Gerald J. Guskey, Montgomery; James A. Hellyer, Milford; Bernard W. Kluesener, Harrison; Gordon K. Stipp, Cincinnati, all of Ohio

[73] Assignee: The Procter and Gamble Company, Cincinnati, Ohio

[ * ] Notice: The term of this patent shall not extend beyond the expiration date of Pat. No. 5,275,835.

[21] Appl. No.: 336,157

[22] Filed: Nov. 8, 1994

[51] Int. Cl.$^6$ ..................................................... A23G 1/00
[52] U.S. Cl. .......................... 426/607; 426/613; 426/660
[58] Field of Search ..................................... 426/607, 804, 426/660

[56] References Cited

U.S. PATENT DOCUMENTS

| | | | |
|---|---|---|---|
| 4,832,975 | 5/1989 | Yang | 426/607 |
| 4,859,483 | 8/1989 | Sollich | 426/519 |
| 4,888,196 | 12/1989 | Ehrman et al. | 426/601 |
| 5,023,106 | 6/1991 | Ehrman et al. | 426/660 |
| 5,066,510 | 11/1991 | Ehrman et al. | 426/607 |
| 5,120,563 | 6/1992 | Mohlenkam, Jr. et al. | 426/601 |
| 5,142,071 | 8/1992 | Kluesener et al. | 554/172 |
| 5,142,072 | 8/1992 | Stipp et al. | 554/172 |
| 5,258,197 | 11/1993 | Wheeler et al. | 426/607 |
| 5,275,835 | 1/1994 | Masterson et al. | 426/607 |
| 5,288,512 | 2/1994 | Seiden | 426/607 |
| 5,380,544 | 1/1995 | Klemann et al. | 426/607 |

FOREIGN PATENT DOCUMENTS

| | | | |
|---|---|---|---|
| 60-53598 | 3/1985 | Japan | C11C 3/08 |
| WO93/15612 | 8/1993 | WIPO | A23D 9/00 |

OTHER PUBLICATIONS

J. C. Peters et al.; "Caprenin 3. Absorption and Caloric Value in Adult Humans"; *Journal of the American College of Toxicology*; pp. 357–367; vol. 10, No. 3, 1991.

*Primary Examiner*—Carolyn Paden
*Attorney, Agent, or Firm*—Tara M. Rosnell; Rose Ann Dabek

[57] ABSTRACT

The present invention relates to flavored confectionery compositions which comprise a flavor enhancing amount of a flavor component, from 25% to 45% of a fat component and from about 55 to about 75% other nonfat confectionery ingredients. The fat component of the flavored confectionery compositions of the present invention comprises at least about 70% of a reduced calorie fat, up to about 15% milkfat, up to about 20% cocoa butter and no more than about 4% diglycerides.

The reduced calorie fat comprising the fat component of the chocolate confectionery compositions herein comprises mixtures of reduced calorie triglycerides which are enriched in long chain fatty acid 2-position isomers (MLM triglycerides). In particular, the reduced calorie fats utilized in the chocolate confectionery compositions herein comprise at least about 40% of the long chain fatty acid 2-position isomer. The reduced calorie fats utilized in the chocolate confectionery compositions herein further comprise at least about 85% combined MML and MLM triglycerides, no more than about 5% combined LLM and LML triglycerides no more than about 2% LLL triglycerides, no more than about 4% MMM triglycerides, and no more than about 6% other triglycerides; wherein M=fatty acids selected from the group consisting of $C_6$ to $C_{10}$ saturated fatty acids, and mixtures thereof, and L=fatty acids selected from the group consisting of $C_{17}$ to $C_{26}$ saturated fatty acids, and mixtures thereof.

18 Claims, No Drawings

REDUCED CALORIE CONFECTIONERY COMPOSITIONS WHICH CONTAIN REDUCED CALORIE FATS WHICH EXHIBIT RAPID TRANSFORMATION TO BETA PHASE

TECHNICAL FIELD

The present invention relates to confectionery compositions which contain reduced calorie fats. The reduced calorie fats herein comprise triglycerides containing medium and long chain fatty acids. These reduced calorie fats exhibit rapid transformation into beta phase. As a result, the reduced calorie confectionery compositions of the present invention require less in mould time.

BACKGROUND OF THE INVENTION

Chocolate is an extremely popular and versatile food product which is characterized by a smooth, creamy consistency upon mastication. Chocolate derives its desirable eating qualities largely from the melting properties of cocoa butter which is typically present in chocolate at about 32% by weight. The melting behavior of cocoa butter is the result of its unique triglyceride composition. However, this unique triglyceride composition, like the triglyceride composition of other natural fats, is relatively high in calories. Approximately 50% of the calories in chocolate products come from fat which is exclusively or predominantly cocoa butter. This means person who must restrict their intake of calories must either reduce the amount of chocolate products they consume, or in the extreme case, completely exclude such products from their diet.

Low calorie cocoa butter substitutes which have physical properties similar to cocoa butter have been developed. See, for example, Ehrman et al; U.S. Pat. No. 4,888,196; Issued December 19, 1989, which discloses flavored confectionery compositions comprising:

a. a flavor enhancing amount of a flavor component;
b. from about 25 to about 45% of a fat component comprising:
  (1) at least about 70% of a reduced calorie fat having:
    (a) at least about 85% combined MLM and MML triglycerides;
    (b) no more than about 5% combined LLM and LML triglycerides;
    (c) no more than about 2% LLL triglycerides;
    (d) no more than about 4% MMM triglycerides;
    (e) no more than about 7% other triglycerides;
    wherein M is a $C_6$ to $C_{10}$ saturated fatty acid residue and L is a $C_{20}$ to $C_{24}$ saturated fatty acid residue;
    (f) a fatty acid composition having:
      (i) from about 40 to about 60% combined $C_8$ and $C_{10}$ saturated fatty acids,
      (ii) a ratio of $C_8$ to $C_{10}$ saturated fatty acids of from about 1:2.5 to about 2.5:1 ,
      (iii) from about 40 to about 60% behenic fatty acid,
  (2) up to about 15% milkfat;
  (3) up to about 20% cocoa butter;
  (4) no more than about 4% diglyceddes; and
c. from about 55 to about 75% other nonfat confectionery ingredients.

The reduced calorie fats utilized in the confectionery compositions of Ehrman et al can be prepared by a variety of techniques such as by random rearrangement of long chain triglycerides and medium chain triglycerides, esterification of glycerol with a blend of the corresponding fatty acids, transesterification of a blend of medium and long chain fatty acid methyl esters with glycerol and transesterification of long chain fatty acid glycerol esters with medium chain triglycerides. Processes for preparing the reduced calorie fats utilized in the confectionery compositions of Ehrman et al are also described, for example, in U.S. Pat. No. 5,142,071 to Kluesener et al; Issued Aug. 25, 1992 and U.S. Pat. No. 5,142,072 to Stipp et al; Issued Aug. 25, 1992.

Unfortunately, reduced calorie fats of the type described in Ehrman et al, which were used in the confectionery compositions disclosed therein, are slower to crystallize to the thermodynamically stable beta structure than reduced calorie fats comprising conventional triglycerides. As a result, chocolate confectionery compositions containing these reduced calorie fats, such as those described in Ehrman et al, require longer in-mould times than confectionery compositions containing conventional triglycerides.

It has now been found that the rate of crystallization of reduced calorie fats such as those utilized in the chocolate confectionery compositions of Ehrman et al is dependent on the distribution of MML and MLM triglycerides present in the reduced calorie fat. Reduced calorie fats prepared according to prior processes typically contain less than about 40% of the MLM long chain fatty acid 2-position isomers. It has now been found that, surprisingly, reduced calorie fats comprising mixtures of reduced calorie triglycerides which are enriched in MLM long chain fatty acid 2-position isomers (e.g., which contain at least about 40% of the long chain fatty acid 2-position isomers) exhibit rapid crystallization into the alpha crystalline phase and rapid transformation to beta phase compared to reduced calorie fats comprising mixtures of reduced calorie triglycerides which contain less than about 40% of the long chain fatty acid 2-position isomer. Therefore, the in-mould time of chocolate confectionery compositions which contain these reduced calorie fats can be reduced by up to about 95%.

SUMMARY OF THE INVENTION

The present invention relates to flavored confectionery compositions which comprise a flavor enhancing amount of a flavor component, from 25% to 45% of a fat component and from about 55 to about 75% other nonfat confectionery ingredients. The fat component of the flavored confectionery compositions of the present invention comprises at least about 70% of a reduced calorie fat, up to about 15% milkfat, up to about 20% cocoa butter and no more than about 4% diglycerides.

The reduced calorie fat comprising the fat component of the chocolate confectionery compositions herein comprises mixtures of reduced calorie triglycerides which are enriched in long chain fatty acid 2-position isomers (MLM triglycerides). In particular, the reduced calorie fats utilized in the chocolate confectionery compositions herein comprise at least about 40% of the long chain fatty acid 2-position isomer. The reduced calorie fats utilized in the chocolate confectionery compositions herein further comprise at least about 85% combined MML and MLM triglycerides, no more than about 5% combined LLM and LML triglycerides, no more than about 2% LLL triglycerides, no more than about 4% MMM triglycerides, and no more than about 6% other triglycerides; wherein M=fatty acids selected from the group consisting of $C_6$ to $C_{10}$ saturated fatty acids, and mixtures thereof, and L=fatty acids selected from the group consisting of $C_{17}$ to $C_{26}$ saturated fatty acids, and mixtures thereof.

The reduced calorie fats utilized in the confectionery compositions of the present invention have the following fatty acid composition by weight percent:

(i) from about 40 to about 60% combined $C_8$ and $C_{10}$ saturated fatty acids, (ii) a ratio of $C_8$ to $C_{10}$ saturated fatty acids of from about 1:2.5 to about 2.5:1; and (iii) from about 40 to about 60% behenic fatty acid.

The reduced calorie fats utilized in the chocolate confectionery compositions of the present invention exhibit rapid crystallization into the alpha crystalline phase and rapid transformation to beta phase.

DETAILED DESCRIPTION OF THE INVENTION

The present invention relates to reduced calorie flavored confectionery compositions which comprise:

a. a flavor enhancing amount of a flavor component;
b. from about 25 to about 45% of a fat component comprising:
  (1) at least about 70% of a reduced calorie fat having:
    (a) at least about 40% MLM triglycerides;
    (b) at least about 85% combined MLM and MML triglycerides;
    (c) no more than about 5% combined LLM and LML triglycerides;
    (d) no more than about 4% LLL triglycerides;
    (e) no more than about 2% MMM triglycerides; and
    (f) no more than about 6% other triglycerides;
  wherein M is a $C_6$ to $C_{10}$ saturated fatty acid residue and L is a $C_{17}$ to $C_{26}$ saturated fatty acid residue;
  (e) a fatty acid composition having:
    (i) from about 40 to about 60% combined $C_8$ and $C_{10}$ saturated fatty acids,
    (ii) a ratio of $C_8$ to $C_{10}$ saturated fatty acids of from about 1:2.5 to about 2.5:1,
    (iii) from about 40 to about 60% behenic fatty acid,
  (2) up to about 15% milkfat;
  (3) up to about 20% cocoa butter;
  (4) no more than about 4% diglycerides; and
c. from about 55 to about 75% other nonfat confectionery ingredients.

It has now been found that, surprisingly, reduced calorie fats comprising mixtures of reduced calorie triglycerides which are enriched in MLM long chain fatty acid 2-position isomers, exhibit rapid crystallization into the desired to beta phase compared to reduced calorie fats comprising mixtures of reduced calorie triglycerides which are not enriched in long chain fatty acid 2-position isomers. Therefore, chocolate confectionery compositions which contain MLM-enriched reduced calorie fats require less in-mould time than chocolate confectionery compositions containing prior reduced calorie fats.

The polymorphic phases, and particularly the beta phase referred to herein, are crystalline fat phases well known to those skilled in the art of fat X-ray crystallography. See Wille et al. "Polymorphism of Cocoa Butter," *J. Am. Oil Chem. Soc.*, Vol. 43 (1966), pp. 491–96, which describes the six crystalline fat phases of cocoa butter.

I. Chocolate Confectionery Compositions

Each component of the reduced calorie confectionery compositions of the present invention is described in detail as follows:

A. Flavor Component

The flavored confectionery compositions herein comprise a flavor-enhancing amount of a chocolate flavor component. The chocolate flavor components comprises flavor constituents which impart positive flavor characteristics, and optionally nonflavor constituents normally present in flavor compositions, e.g., flavor carriers. As used herein, the term "flavor-enhancing amount" refers to an amount of the flavor component sufficient to impart positive flavor characteristics to the composition. As such, the amount of the flavor component sufficient to be "flavor enhancing" can depend on the flavor source used, the flavor effects desired and like factors. Typically, the flavor component (nonfat constituents) comprises from about 0.1 to about 25% of the composition.

Suitable chocolate flavors can be derived from chocolate-liquor, cocoa powder, or blends thereof. These chocolate materials (fat plus nonfat ingredients) are typically included at from about 5 to about 25% of the composition. As used herein, "chocolate-liquor" refers to the solid or semi-plastic food prepared by finely grinding cacao nibs. Chocolate-liquor usually contains from about 50 to about 58% cocoa butter fat. As used herein, "cocoa powder" refers to the residual material remaining after part of the cocoa butter fat has been removed from ground cacao nibs. Cocoa powder usually contains from about 10 to about 22% cocoa butter fat. The chocolate confectionery compositions utilized in the process of the present invention can also contain other sources of flavor, including vanillin, ethyl vanillin, spices, coffee, brown sugar, etc., or mixtures of these flavors.

B. Fat Component

The flavored confectionery compositions of the present invention further comprises a fat component. As used herein, the term "fat component" refers to all triglycerides, diglycerides and monoglycerides present in the composition. For example, if chocolate-liquor is used to formulate chocolate compositions, the cocoa butter portion is included as part of the fat component. If milk solids are used, for example, in milk chocolate-flavored compositions, any milk fat present is included as part of the fat component.

The fat component comprises from about 25 to about 45% of the composition. The fat component can comprise a reduced calorie fat, milk fat, cocoa butter and diglyceride fats. The fat component preferably comprises from about 28 to about 35% of the composition.

1. Reduced Calorie Fat

The major constituent in this fat component is a reduced calorie fat. By "reduced calorie fat" as used herein is meant fats that provide an at least about 10% and preferably an at least about 30%, reduction in calories relative to corn oil. These reduced calorie fats usually provide between about 20% and about 50% reduction in calories. The reduction in calories provided by these reduced calorie fats is based on the net energy gain (in Kcal) of rats that have ingested a diet containing the reduced calorie fat, relative to the net energy gain (in Kcal) of rats that have ingested an identical diet, but containing corn oil instead of the reduced calorie fat. The test diets used are nutritionally adequate to support both maintenance and growth of the rats. Total food intake and fat/oil intake are also matched between the two diet groups so that differences in net carcass energy gain are due entirely to the utilizable energy content of the fat/oil. ("Net energy gain" is based on the total carcass energy (in Kcal) of the rats fed the test diet for some period of time (usually 4 weeks), reduced by the mean starting carcass energy (in Kcal)

determined from a study of a different group of rats of the same sex, strain, and similar body weight fed a test diet that does not contain the fat/oil. "Total carcass energy" is determined by the dry carcass energy program (Kcal per gram) multiplied by the dry weight of the carcass (in grams). "Carcass energy per gram" is based on the carcass energy (in Kcal) as determined by bomb Calorimetry of a homogeneous sample of the total dry carcass. All of these energy values are the average of a representative sample of rats (i.e., 10 rats).

The particular amount of reduced calorie fat present in the fat component depends upon the degree of calorie reduction desired and the particular mouth melt and firmness properties desired for the chocolate confectionery composition. These reduced calorie fats comprise at least about 70% of the fat component. Preferably, these reduced calorie fats comprise at least about 75% of the fat component, more preferably at least about 80%, and most preferably at least about 85% of the fat component.

The reduced calorie fats used in the chocolate confectionery compositions of the present invention comprise:

(a) at least about 40% by weight MLM triglycerides;

(b) at least about 85% combined MLM and MML triglycerides;

(c) no more than about 5% combined LLM and LML triglycerides;

(d) no more than about 4% LLL triglycerides;

(e) no more than about 2% MMM triglycerides; and (d) no more than about 6% other triglycerides.

wherein M=fatty acids selected from the group consisting of $C_6$ to $C_{10}$ saturated fatty acids, and mixtures thereof, and L=fatty acids selected from the group consisting of $C_{17}$ to $C_{26}$ saturated fatty acids, and mixtures thereof.

By "medium chain fatty acids" is meant $C_{6:0}$ (caproic), $C_{8:0}$ (caprylic), or $C_{10:0}$ (capric) fatty acids or mixtures thereof. The $C_7$ and $C_9$ saturated fatty acids are not commonly found, but are not excluded from the possible medium chain fatty acids. The present medium chain fatty acids do not include lauric acid ($C_{12:0}$), sometimes referred to in the art as a medium chain fatty acid.

By "long chain fatty acids" is meant $C_{17:0}$ (margaric), $C_{18:0}$ (stearic), $C_{19:0}$ (nonadecylic), $C_{20:0}$ (arachidic), $C_{21:0}$ (heneicosanoic), $C_{22:0}$ (behenic), $C_{23:0}$ (tricosanoic), $C_{24:0}$ (lignoceric), $C_{25:0}$ (pentacosanoic), or $C_{26:0}$ (cerotic) fatty acids, or mixtures thereof.

As used herein, "MML" triglycerides are those triglycerides which contain a long chain fatty acid residue in the #1 or #3 position on the glycerol backbone and two medium chain fatty acid residues in the remaining two positions. Similarly, "LLM" triglycerides are those triglycerides which contain a medium chain fatty acid residue in the #1 or #3 position on the glycerol backbone and two long chain fatty acid residues in the remaining two positions, "LML" triglycerides are those triglycerides which contain a medium chain fatty acid residue in the #2 position and two long chain fatty acid residues in the #1 and #3 positions and "MLM" triglycerides are those triglycerides which contain a long chain fatty acid residue in the #2 position on the glycerol backbone and two medium chain fatty acid residues in the remaining two positions. "LLL" triglycerides are those triglycerides containing three long chain fatty acid residues on the glycerol backbone and "MMM" triglycerides are those triglycerides containing three medium chain fatty acid residues on the glycerol backbone. As used herein the term "other triglycerides" refers to triglycerides other than MML, MLM, LML, LLM, LLL and MMM. MLM triglycerides are also referred to herein as long chain fatty acid 2-position isomers.

One key element of the reduced calorie fats used in the chocolate confectionery compositions of the present invention is that they contain at least about 40% of the MLM long chain fatty acid 2-position isomer. Preferably, the reduced calorie fats used in the chocolate confectionery compositions of the present invention contain at least about 45% MLM triglycerides, more preferably at least about 60% MLM triglycerides, and most preferably at least about 80% MLM triglycerides. In general, the higher the level of MLM triglycerides comprising the reduced calorie fat, the faster the rate of crystallization of the fat into alpha phase and the faster the subsequent transformation to beta phase. Typically, a reduced calorie fat of the type described herein which contains at least about 40% MLM triglycerides will crystallize into the desired beta phase in less than about 8 hours, preferably less than about 4 hours, more preferably less than about 2 hours, even more preferably less than about 60 minutes, and most preferably less than about 30 minutes.

Reduced calorie fats prepared according to the process of the present invention have a melting point ranging from about 28° C. to about 36° C., preferably from about 31° C. to about 36° C., as measured by the differential scanning calorimetry method described in the Analytical Methods Section.

The reduced calorie fats described herein further comprise at least about 85% combined MML and MLM triglycerides, preferably at least about 90% combined MML and MLM triglycerides, most preferably at least about 94% combined MML and MLM triglycerides. The reduced calorie fats described herein also comprise no more than about 5% by weight combined LLM and LML triglycerides, preferably no more than about 3% by weight combined LLM and LML triglycerides, more preferably no more than about 1% by weight combined LLM and LML triglycerides, and most preferably no more than about 0.5% by weight combined LLM and LML triglycerides. The reduced calorie fats described in the present invention typically contain no more than 2%, preferably no more than 1%, more preferably no more than 0.5%, LLL triglycerides and typically contain no more 4%, preferably no more than 2%, more preferably no more than 1% MMM triglycerides. The reduced calorie fats described herein further comprise no more than about 6%, preferably no more than about 4%, and most preferably no more than about 2% other triglycerides.

The reduced calorie fats used in the chocolate confectionery compositions of the present invention have the following fatty acid composition by weight percent:

(a) from about 15% to about 70% $C_6$ to $C_{10}$ saturated fatty acids;

(b) from about 10% to about 70% $C_{17}$ to $C_{26}$ saturated fatty acids;

(c) not more than about 10% fatty acids selected from the group consisting of $C_{12:0}$ and $C_{14:0}$, and mixtures thereof;

(d) not more than about 20% fatty acids selected from the group consisting of $C_{18:1}$, $C_{18:2}$, $C_{18:3}$ and mixtures thereof, and (e) not more than about 4% $C_{18:2}$ fatty acids.

Preferably, the medium chain fatty acids present in the reduced calorie fats comprise from about 35% to about 60%, preferably from about 40% to about 60%, combined $C_8$ and $C_{10}$ saturated fatty acid. Preferably, the molar ratio of $C_8$ to $C_{10}$ saturated fatty acids in these reduced calorie fats ranges from about 30:70 to about 70:30, more preferably from about 40:60 to about 60:40.

The reduced calorie fats used in the chocolate confectionery compositions of the present invention can contain limited amounts of other fatty acids besides medium and long chain fatty acids, without losing the benefits of the invention. As indicated above, small amounts of $C_{12:0}$, $C_{14:0}$, $C_{18:1}$, $C_{18:2}$ and $C_{18:3}$ can be present.

Palmitic acids ($C_{16:0}$) is about 95% absorbed by the body, while the longer chain fatty acids are less absorbed. Therefore, it is preferred that the present reduced calorie fats contain not more than about 10% by weight $C_{16:0}$ fatty acid.

In another preferred embodiment, the reduced calorie fat will contain not more than about 6% by weight fatty acids selected from the group consisting of $C_{18:1}$, $C_{18:2}$, $C_{18:3}$, and mixtures thereof, more preferably not more than about 1%, most preferably not more than about 0.5%. Preferred reduced calorie fats also contain not more than 3%, and more preferably not more than about 1% by weight fatty acids selected from the group consisting of $C_{12:0}$ (lauric) and $C_{14:0}$ (myristic), and mixtures thereof. Lauric and myristic result in more fat deposition than medium chain fatty acids.

Preferred reduced calorie fats according to the present invention have the following preferred and most preferred carbon number profiles (CNP):

| CNP | PREFERRED (%) | MOST PREFERRED (%) |
| --- | --- | --- |
| 32 or lower | <3 | <1 |
| 34 | <2 | <1 |
| 36 | <4 | <2 |
| 38 | 15–40 | 15–30 |
| 40 | 35–60 | 45–55 |
| 42 | 15–35 | 20–30 |
| 44 | <2 | <1 |
| 46 | <1 | <0.6 |
| 48 | <0.8 | <0.6 |
| 50 | <0.6 | <0.5 |
| 52 | <0.4 | <0.3 |
| 54 or higher | <0.9 | <0.4 |

The carbon number profile of the reduced calorie fats prepared according to the process of the present invention is such that from about 40% to 100% of the triglycerides having a carbon number of 42 are long chain fatty acid 2-position isomers. Preferably from about 45% to 100% of the triglycerides having a carbon number of 42 are long chain fatty acid 2-position isomers, and most preferably from about 60% to 100% of the triglycerides having a carbon number of 42 are long chain fatty acid 2-position isomers.

To prepare the reduced calorie fats herein, an at least about 60% pure $C_{18}$–$C_{24}$ long chain fatty acid monoglyceride or mixture thereof is esterified with an at least about 90% pure $C_6$–$C_{10}$ medium chain fatty acid or mixture thereof at a temperature of from about 225° to about 350° C. and at a pressure of from about 200 to about 2000 mmHg in the substantial absence of an esterification catalyst. The mole ratio of fatty acid to monoglyceride used in this monoglyceride esterification is at least about 3:1. Water generated during this monoglyceride esterification is continuously removed.

The medium chain fatty acids useful for preparing the reduced calorie fats can be derived from a number of different sources. For example, medium chain saturated fatty acids can be obtained from coconut, palm kernel or babassu oils. They can also be obtained from commercial medium chain triglycerides, such as the Captex 300 brands sold by Capital City Products of Columbus, Ohio. Typically, these sources of medium chain fatty acids are subjected to hydrolysis to provide a mixture of free fatty acids, followed by thermal distillation to provide a fatty acid fraction enriched in the medium chain fatty acids. It is also desirable that the sources of medium chain fatty acids have good thermal color stability, e.g., after heating at 205° C. for 2 hours, a mixture of $C_8$ and $C_{10}$ saturated fatty acids has only a 5–10% optical transmission reduction when measured at 440/550 nanometers.

The source of medium chain fatty acids used to prepare the reduced calorie fats needs to be of sufficiently high purity to provide the desired level of MML/MLM triglycerides. Generally the source of medium chain fatty acids is at least about 90% pure in medium chain fatty acids, and is preferably at least about 95% pure, in such fatty acids. Preferably, the source of medium chain fatty acids comprises $C_8$ saturated fatty acid, $C_{10}$ saturated fatty acid, or a mixture of $C_8$ and $C_{10}$ saturated fatty acids. The weight ratio of $C_8$ to $C_{10}$ saturated fatty acids is preferably in the range of from about 30:70 to about 70:30. A weight ratio of about 45:55 is most typical.

The long chain (i.e., $C_{18}$–$C_{24}$) fatty acid monoglycerides used to prepare the reduced calorie fats can be prepared by a wide variety of techniques. These techniques include:

(a) Esterification or transesterification of glycerol acetone or glycidol with the respective long chain fatty acid(s), or long chain fatty acid lower alkyl (e.g., methyl or ethyl) ester(s), followed by hydrolysis of the respective blocking group. See Hartman, "Preparation of alpha.-Monoglycerides by a Modified Isopropylidene-Glycerol Method," *Chemistry and Industry* (Jun. 18, 1960), pp. 711–12 (herein incorporated by reference), which discloses the preparation of 1-monoglycerides by the use of the modified isopropylidene-glycerol method, and Mattson et al, "Synthesis and Properties of Glycerides," *J. Lipid Res.*, Vol. 3, No. 3 (1962), pp. 281–96 (herein incorporated), which discloses the same method. See also U.S. Pat. No. 3,595,888 to Reiser et al, issued Jul. 27, 1971, and U.S. Pat. No. 3,251,870 to Dalby, issued May 17, 1966 (herein incorporated by reference) which disclose isopropylideneglycerol and glycidol methods for synthesizing monoglycerides.

(b) Esterification or transesterification of glycerol with the respective long chain fatty acid(s), or long chain fatty acid lower alkyl ester(s), optionally using strong base esterification catalysts such as sodium hydroxide or sodium methoxide, or strong acid esterification catalysts such as hydrogen fluoride, perchloric acid, phosphoric acid or p-toluenesulfonic acid. See Choudhury, "The Preparation and Purification of Monoglycerides: Direct Esterification of Fatty Acids with Glycerol", *J. Am. Oil Chem. Soc.* Vol. 39 (1962), pp. 345–47 (herein incorporated by reference), which discloses the preparation of monoglycerides by esterification of glycerol with various fatty acids (e.g. stearic acid), optionally using sodium hydroxide as the catalyst. See also U.S. Pat. No. 3,551,464 to Miller et al, issued Dec. 29, 1970 (herein incorporated by reference), which discloses the preparation of monoglycerides from long chain aliphatic acids and esters that are esterified or transesterified with glycerol using hydrogen fluoride as the catalyst.

(c) Hydrolysis of a naturally occurring oil, preferably a completely or substantially completely hydrogenated naturally occurring oil (e.g., high erucic acid rapeseed oil or soybean oil hydrogenated to an Iodine Value (I.V.) of about 10 or less) by the use of a 1,3-specific lipase, followed by removal of the residual fatty acids, glycerol, diglycerides and triglycerides. See Holmberg, "Enzymatic Preparation of Monoglycerides in Microemulsion," *J. Am. Oil Ghent. Soc.*, Vol. 65 (1988), pp. 1544–48, which is incorporated by reference.

(d) Esterification or transesterification of glycerol with the respective long chain fatty acid(s) or long chain fatty acid lower alkyl ester(s) using a monoglyceride lipase (e.g., Ammano Pharmaceutical type G), followed by purification. See European patent application 191,217 to Yamaguchi et al, published Aug. 20, 1986, which is incorporated by reference.

(e) Glycerolysis of naturally occurring oils, preferably completely or substantially completely hydrogenated naturally occurring oils. See Choudhury, "The Preparation and Purification of Monoglycerides; Glycerolysis of Oils", *J. Ant. Oil Chem. Soc.*, Vol. 37 (1960), pp. 483–86, and Feuge et al, "Modification of Vegetable Oils: The Practical Preparation of Mono- and Diglycerides," *Oil and Soap*, (August, 1946), pp. 259–64, which are incorporated by reference.

The long chain fatty acids per se or naturally occurring fats and oils can serve as sources of the long chain fatty acids. For example, soybean oil and high erucic acid rapeseed oil hydrogenated to an I.V. of about 10 or less are good sources of stearic and behenic fatty acids, respectively. Odd chain length long chain fatty acids can be derived from certain marine oils. Alternatively, mixed chain length fatty acid monoglycerides can be fractionated to provide a source of long chain fatty acids. For example, hydrogenated high erucic acid rapeseed oil can be transesterified with glycerol to provide a mixture of long chain fatty acid monoglycerides which can be subsequently fractionated by liquid/liquid extraction or adsorptive separation to yield a monobehenin-enriched mixture. The source of long chain fatty acids usually needs to be of sufficiently high purity in order to provide monoglycerides suitable for the esterification process of the present invention. Usually, the source of long chain fatty acids is at least about 90% pure in long chain fatty acids, and is preferably at least about 95% pure in such fatty acids. Preferably, the purity is in the range of from about 90 to about 98% long chain fatty acids.

The source of long chain fatty acid monoglycerides needs to be of sufficiently high purity in order to provide the desired level of MML/MLM triglycerides. Generally, the source of these monoglycerides, needs to be at least about 60% pure in long chain fatty acid monoglycerides, and is preferably at least about 90% pure, most preferably at least about 95% pure, in such monoglycerides. Such purities can typically be achieved by purification of the crude source of monoglycerides by molecular distillation, fractional crystallization, liquid/liquid extraction or adsorptive separation, e.g., by weak acid ion exchange resins to remove various impurities, including unreacted long chain fatty acids and particularly, to decrease the level of dilong chain fatty acid diglycerides (LL) to about 3% or less. Residual glycerol present in the crude source of monoglycerides can be removed by settling, centrifugation, thermal distillation, or fractional crystallization to decrease the glycerol level to about 1% or less. In addition, it is desirable to minimize the formation of glycerol dehydration products (e.g., polyglycerols) to a level of about 1% or less.

The preferred source of monoglycerides for preparing the reduced calorie fats is at least about 90%, and is preferably at least about 95%, pure monobehenin. This preferred monoglyceride can be obtained by hydrolysis of substantially completely hydrogenated (i.e., I.V. about 10 or less) high erucic acid rapeseed oil, thermal distillation of the resulting fatty acid mixture to provide a behenic fatty acid-enriched fraction, and then esterification of glycerol with this behenic acid-enriched fraction to provide a crude mixture of monoglycerides. This synthesis route minimizes the formation of base catalyzed by-products such as difatty ketones or diglycerols. This crude monoglyceride mixture can be subsequently purified by molecular distillation, solvent (e.g., ethyl alcohol) crystallization, liquid/liquid extraction or adsorption on a weak acid ion exchange resin to yield a source of monoglycerides having the desired purity of monobehenin.

In order to provide a mixture of MML/MLM triglycerides which is enriched in the long chain fatty acid 2-position isomer, it is important to use an excess of the medium chain fatty acids relative to the monoglycerides. Typically, the mole ratio of fatty acid to monoglyceride is in the range of from about 3:1 to about 24:1, with a preferred mole ratio in the range of from about 16:1 to about 18:1, i.e. a substantial excess.

An important aspect of the esterification process used to prepared the reduced calorie fats is that it is typically carried out in a solvent-free system. At the temperatures at which the esterification process is carried out, the mixture of monoglycerides and medium chain fatty acids forms an essentially homogeneous melt. Accordingly, solvents are not required in carrying out the esterification process of the present invention.

Another important aspect of the esterification process used to prepare the reduced calorie fats is that it is carried out in the substantial absence of an esterification catalyst. As used herein, the term "substantial absence of esterification catalyst" means that the esterification process of the present invention is carried out without intentionally adding such catalysts. Esterification catalysts such as strong bases (e.g. sodium hydroxide or sodium methoxide) and strong acids (e.g. phosphoric acid or p-toluenesulfonic acid) are not required in order to carry out the esterification process of the present invention. Indeed, it has been surprisingly found that strong acid esterification catalysts such as phosphoric acid or p-toluenesulfonic acid tend to promote undesired rearrangement of the resulting glycerides, thus decreasing the level of desired MML/MLM triglycerides. In addition to promoting undesired rearrangement, strong base esterification catalysts such as sodium methoxide have also been found to cause the formation of undesired di-fatty ketone by-products.

An especially important aspect of the esterification process used to prepare the reduced calorie fats is the esterification temperature. Prior processes for the preparation of MML/MLM triglycerides taught that at esterification temperatures of from about 140° C. to about 250° C., the esterification of monoglycerides with medium chain fatty acids is favored over rearrangement of the long chain fatty acid residues attached to the glyceride due to hydrolysis/reesterification, so that MML/MLM triglycerides could be selectively made. Preferable esterification temperatures according to these prior processes ranged from about 140° C. to about 220° C.

Surprisingly, it has now been determined that, at esterification temperatures of from about 225° C. to about 350° C., preferably from about 225° C. to about 300° C., more preferably from about 225° C. to about 245° C., and most preferably from about 235° C. to about 245° C., MML/MLM triglycerides which are enriched in long chain fatty acid 2-positional isomers can be formed. In particular, the amount of 2-positional isomer in the reduced calorie fat can be increased by up to about 67% over prior reduced calorie fats when the esterification reaction is carried out at temperatures ranging from 225° C. to about 350° C. This is desirable since it has been found that triglyceride mixture containing higher levels of MLM triglycerides crystallize at a much faster rate than triglyceride mixtures containing lower levels of MML triglycerides.

A second especially important aspect of the process used to prepare the reduced calorie fats is the pressure at which the selective esterification reaction is run. Prior processes were typically run at pressures ranging from about 200 to about 760 mmHg. It has now been found, however, that MML/MLM triglycerides which are enriched in long chain fatty acid 2-positional isomers can be formed by running the esterification reaction at pressures ranging from about 200 to about 2000 mmHg, preferably from about 700 to about 1750 mmHg, more preferably from about 700 to about 1520 mmHg.

Another important aspect of the esterification process used to prepare the reduced calorie fats is the removal of water generated during the reaction of the medium chain fatty acids with the monoglycerides. It has been found that water generated during this reaction that remains in the reaction mixture can cause hydrolysis of the resulting glycerides, and therefore lead to undesired rearrangement that decreases the level of desired MML/MLM triglycerides. Accordingly, water that is generated during the reaction is continuously removed from the reaction mixture. Suitable methods for continuous removal of this generated water include vacuum stripping of the reaction mixture (e.g., at pressures of from 200 to about 700 mmHg), inert gas (e.g., nitrogen) sparging of the reaction mixture using high shear mixing with high gas velocities, adsorption by hydrophilic materials such as zeolite molecular sieves, activated carbon and activated alumina, or combinations of these techniques. For example, in the case of nitrogen gas sparging, 0.1 to 10 l./min. gas flow per liter of reaction mixture in conjunction with high shear mixing (e.g. a 5 to 600 m./min. tip speed) are preferred for removal of generated water. (This degree of high shear mixing is typically achieved by a drive motor energy input of 1.5 to 3 kilowatts per 1000 liters of reaction mixture.) In addition, it is preferred that the fatty acids and monoglyceride starting materials be essentially anhydrous (e.g. by vacuum dehydration) prior to esterification.

The esterification process can be carried out as either a batch or continuous reaction system. For example, mixed flow configuration can be used to continuously react the medium chain fatty acids with the monoglycerides in one or more reaction stages. It is preferred that the reaction system(s) be equipped with partial condensers to allow continuous reflux of the medium chain fatty acids while generated water is being removed. Alternatively, thin film-type reaction systems operated under vacuum at high temperatures with short residence times can be used in this esterification step. Typically, the solid or liquid monoglycerides are added to the melted medium chain fatty acids at the desired esterification temperature to permit more effective removal of generated water and to minimize disproportionation of the monoglycerides to diglycerides/glycerol, as well as the reaction of monoglycerides with medium and long chain (ML) diglycerides. The monoglycerides are also preferably added slowly to the melted fatty acids at a controlled rate of addition during esterification to minimize the concentration of unreacted monoglycerides in the mixture, and thus minimize the formation of MLL/LML triglycerides.

The particular reaction times for carrying out this esterification process can vary greatly depending upon the mole ratio of fatty acids to monoglycerides used, the particular esterification temperatures used, and the yield/degree of purity desired for the MML/MLM triglycerides. In general the reaction times for carrying out the esterification process are less than the reaction times required for prior esterification processes. Usually, reaction times of from about 1 to about 6 hours are suitable for batch reaction systems. Preferably, the esterification process is carried out for a period of from about 1 to about 3 hours, more preferably from about 1 to about 2 hours, in a batch reaction system. (Equivalent residence times can be used in continuous reaction systems.)

An important result of the esterification process is that at least 99% of the partial glycerides are convened to the respective triglycerides. Preferably, very low diglyceride levels, e.g. diglyceride levels of about 1% or less, are achieved. This makes the MML/MLM triglycerides obtained by the estefication process of the present invention particularly suitable for flavored confectionery fat products.

After the esterification process described hereinbefore has been carried out for the appropriate time, the level of desired MML/MLM triglycerides in the triglyceride fraction of the reaction mixture is usually at least about 55%, is typically at least about 80%, and is preferably at least about 90%. The level of MML/MLM triglycerides in this reaction mixture can be sufficiently high so that further purification is unnecessary, particularly depending upon the proposed use of the MML/MLM triglycerides. However, purification of the reaction mixture resulting from the esterification step is typically required in order to remove various components such as unreacted medium chain fatty acids, and, in particular, MMM and MLL/LML triglycerides. Purification can also increase the level of MLM triglycerides present in the reaction mixture. Subsequent purification can be carried out by a variety of techniques known in the art. See, for example, Kluesener et al; U.S. Pat. No. 5,142,071; Issued Aug. 25, 1992, herein incorporated by reference.

2. Milk fat and Cocoa Butter

The fat component can tolerate up to certain levels of milk fat and cocoa butter. Milk fat (sometimes referred to as "butterfat") is usually present in the fat component as the result of the inclusion of milk solids in milk chocolate-flavored confectionery compositions. However, milk fat can also be present as the result of the inclusion of butter oil. Milk fat can generally be tolerated in the fat component at levels up to about 15%. For milk chocolate-flavored compositions that optionally contain cocoa butter, milk fat is typically present in the fat component at a level of from about 3 to about 14%, and preferably at a level of from about 3 to about 12%.

The cocoa butter present in the fat component can be included as an added fat. However, cocoa butter is more typically included as a result of its being present in the source of chocolate flavoring (e.g., cocoa powder, chocolate liquor, or more typically blends thereof) used in the chocolate confectionery composition. Cocoa butter can generally be tolerated in the fat component at levels up to about 20%. Cocoa butter is typically present in the fat component at a level of from about 1 to about 14%, and more preferably at a level of from about 3 to about 12%.

3. Diglycerides and Other Confectionery Fats

The reduced calorie fat typically contributes most, if not all, of the diglycerides present in the fat component. However, other fats present in the fat component can also contribute a certain portion of diglycerides. For bloom resistance of the chocolate confectionery composition, it is particularly important to minimize the level of diglycerides in the fat component. Up to about 4% diglycerides can be tolerated in the fat component. Preferably, the level of diglycerides in the fat component is no more than about 2%, more preferably no more than about 1%, and most preferably no more than about 0.5%.

In addition to the reduced calorie fat, milk fat, and cocoa butter, the fat component of the present invention can comprise other compatible confectionery fats. These compatible confectionery fats include cocoa butter substitutes derived from illipe butter (Borneo allow), Shea butter, Mowrah fat and palm oil. Suitable cocoa butter substitutes derived from palm oil are the POP fats disclosed in U.S. Pat. No. 4,594,259 to Baker et al, issued Jun. 10, 1986, which is incorporated by reference. These cocoa butter substitute fats can be included as partial or total replacements for the cocoa butter present in the fat component. However, because of their higher caloric value, these cocoa butter substitute fats are typically not included in the fat component.

C. Other Nonfat Confectionery Ingredients

1. Sugars, Sugar Alcohols, and Reduced Calorie Sweeteners

One particularly important nonfat ingredient in these chocolate confectionery compositions is sugar. Sugar is typically present in such compositions at from about 35 to about 60%, and preferably at from about 40 to about 55%, of the composition. Sources of sugar include sucrose, fructose, glucose, maltose and mixtures thereof. The sugar typically has a particle size in the range of from about 0.0002 to about 0.0016 inches (from about 5 to about 40 microns) in the finished chocolate product.

For dietary reasons, the sugar can be completely or partially substituted with a sugar alcohol. Suitable sugar alcohols include sorbitol, xylitol, mannitol and mixtures thereof. For further calorie reduction, the sugar or sugar alcohol can be completely or partially substituted with a reduced calorie sweetener. These reduced calorie sweeteners include, but are not limited to, Aspartame, saccharin, alitame, thaumatin, dihydrochalcones, cyclamates, steviosides, glycyrrhizins, synthetic alkoxy aromatics, such as Dulcin and P-4000, sucrolose, suosan, miraculin, monellin, talin, cyclohexylsulfamates. substituted imidazolines, synthetic sulfamic acids such as acesulfame, acesulfam-K and n-substituted sulfamic acids, oximes such as perilarline, rebaudioside-A peptides such as aspartyl malonates and succanilic acids, dipeptides, amino acid based sweeteners such as gem-diaminoalkanes, meta-aminobenzoic acid, L-aminodicarboxylic acid alkanes, and amides of certain alphaaminodicarboxylic acids and gem-diamines, and 3-hydroxy 1 alkyloxphenyl aliphatic carboxylates or heterocyclic aromatic carboxylates. When these reduced calorie sweeteners are used, it can be desirable to include bulking or bodying agents. Suitable bulking agents include nondigestible carbohydrates, for example, polydextrose and 5-C hydroxy methyl aldose compounds (See Mazur et al.; European Patent Applications 341,062 and 341,063).

2. Milk solids

Especially in milk chocolate compositions, the chocolate confectionery composition can also include milk solids (essentially dry), usually at from about 9 to about 20% of the composition, and typically at from about 12 to about 18%. Suitable sources of essentially dry milk solids can be obtained from cream, milk, concentrated milk, sweetened condensed milk, skim milk, sweetened condensed skim milk, concentrated buttermilk, and the like. (As previously stated, any fat present in the milk solids, such as milk fat, is considered part of the fat component.)

3. Emulsifiers and Other Minor Ingredients

Flavored confectionery compositions usually include an emulsifier to "wet" the sugar panicles with the fat component. Suitable emulsifiers include sorbitan monostearate, polysorbate 60, polyglycerol esters, sucrose partial esters, and particularly lecithin. These emulsifiers are usually present at up to about 1.5% of the composition, and typically at up to about 0.5%. Preferred levels of emulsifier are from about 0.05 to about 0.5%. Other minor ingredients such as salt normally present in fat-based confections can be included, as well as optional components, such as the pharmaceutical actives disclosed at column 7, lines 1–35 of U.S. Pat. No. 4,786,502 to Chapura et al., issued Nov. 22, 1988, which is incorporated by reference.

II. Preparation of Flavored Confectionery Compositions

The flavored confectionery compositions of the present invention are prepared as follows:

A. Formulation of Ingredients

Initially, a chocolate-flavored confectionery mixture is formulated. Some typical chocolate formulations include milk chocolate-flavored compositions, and dark chocolate-flavored compositions. In addition to the reduced calorie fat, milk chocolate-flavored compositions typically comprise sugar, cocoa powder, optionally chocolate liquor, milk solids, lecithin as the emulsifier, and other confectionery ingredients such as vanillin and salt. Dark chocolate-flavored compositions are similar to milk chocolate-flavored compositions but typically do not include milk solids.

The total fat present in these chocolate-flavored formulations can be adjusted to provide the desired viscosity. For molding or depositing applications, the amount of total fat is preferably lower (e.g. from about 15% to about 45% fat, preferably from about 25% to about 35% fat). For enrobing applications, the amount of total fat is preferably higher (e.g. from about 15% to about 45%, preferably from about 28% to about 40%). The ratios of sugar, cocoa powder, chocolate liquor, and milk solids can vary depending upon the flavor desired.

The chocolate-flavored formulations are prepared by mixing the ingredients to "wet" them with the reduced calorie fat and to provide a consistency suitable for the subsequent refining step. During this mixing step, sugar, milk solids, salt, cocoa powder and optionally a portion of the total lecithin are added to a mixer. Then, the melted chocolate-liquor (if any) and a portion of the reduced calorie fat are added to the mixer. These ingredients are stirred for a period of time sufficient to "wet" the dry ingredients with the fat. The particular time period is not critical and is typically about 15 minutes. During this mixing step, the contents of the mixer are heated to a temperature at least such that the mass becomes fluid, typically from about 100° F. to about 125° F. (from about 37.8° C. to about 51.7° C.). Contact with moisture is avoided during this step. The consistency of the chocolate formulation after mixing is typically that of soft putty.

B. Refining Formulation

After mixing, the chocolate-flavored formulation is typically refined (milled) to reduce the solids, in particular the sugar, to the desired particle size, typically in the range of from about 0.0002 to about 0.0016 inches (5 to 40 microns).

This refining step also coats the solids with the fat. Typically, three, four or five water-cooled rolls, each progressively faster in speed, are used to refine the formulation. Pressure between the rolls is adjusted to achieve the desired fineness for the solids. As in the dry mixing step, contact with moisture is avoided during refining. In particular, the rolls are not cooled to or below the dewpoint of ambient air. The consistency of the chocolate-flavored formulation after refining is typically that of flakes.

C. Conching Refined Formulation

After refining, the chocolate-flavored formulation is dry-conched to remelt and redistribute the fat on the surface of the solids in the refined mix. The moisture content of the mix is reduced to about 1% or less. Certain volatile compounds are also removed which improves the flavor. In this dry conching step, flakes from the refining step are first broken into a powdery mass in a mixer which is typically heated to at least about 125° F. (51.7° C.). When this temperature is reached, the mass has the consistency of lumps of firm putty. The contents of the mixer can be adjusted to temperatures in the range of from about 100° F. to about 160° F. (37.8° C. to 71.1° C.) for milk chocolate-flavored formulations and to temperatures in the range of from about 120° F. to about 180° F. (48.9° C. to 82.2° C.) for dark chocolate-flavored formulations. The total time required for this dry-conching step can typically range from about 1 to about 10 hours.

After dry-conching, the chocolate-flavored formulation is wet-conched. During wet-conching, the remaining portion of the reduced calorie fat and optionally lecithin are added and then mixed to provide a viscous fluid mass. The contents of the mixer can be adjusted to temperatures in the range of from about 100° to about 160° F. (37.8° C. to 71.1° C.), the particular temperature depending upon the particular chocolate-flavored formulation. The total time required for this wet-conching step can typically range from about 2 to about 20 hours. After this wet-conching step, additional lecithin can be added to adjust the viscosity of the mass to that required for the intended application. Mixing is continued, typically for about 10 to about 60 minutes.

D. Tempering Conched Formulation

After dry-conching and wet-conching as described hereinabove, the chocolate confectionery composition is subjected to dynamic tempering. The benefits of dynamic tempering can be obtained by tempering the composition after, for example, the conching step. During tempering, a portion of the fat is precrystallized such that the finished, crystallized product will contain stable crystals and will not be susceptible to undesirable changes in mouthmelt characteristics or appearance under typical conditions of product distribution and handling.

Dynamic tempering of the flavored confectionery products herein is brought about by first rapidly cooling and then conditioning such a composition while working the composition to impart shear agitation thereto. Thus, in a first step of such a dynamic tempering procedure, a confectionery composition of the type hereinbefore described, with its fat component in a non-crystalline state—for example, conched chocolate compositions at a temperature from about 100° F. to about 160° F. (37.8° C. to 71.1° C.)—can be quickly cooled to a temperature of less than about 70° F. (21.1° C.) in tempering equipment which imparts shear agitation to the composition therein. Such cooling generally occurs at a rate of from 0.8° F./min. to about 150° F./min. (0.4° C./min. to 83° C./min.), more preferably at a rate of from about 1.5° F./min. to about 100° F./min. (0.8° C./min. to 56° C./min.). Preferably the compositions are cooled during this procedure to a temperature within the range of from about 55° F. to about 70° F. (12.8° C. to 21.1° C.). During the cooling procedure, shear agitation is imparted to the composition to the extent of shear rates ranging from about 400 to about 8000 sec-1, more preferably from about 500 to about 6000 sec-1.

Typically, the cooling step of the dynamic tempering procedure is carried out in a conventional swept-wall chocolate tempering unit or equivalent equipment as hereinafter more fully described. The temperature of the coolant used for this cooling operation in this equipment is less than the final temperature of the chocolate-flavored composition. Typically the coolant temperature is in the range of from about −10° to about 65° F. (−23.3° to 18.3° C.). More preferably, the coolant temperature is in the range of from about 20° to about 45° F. (−6.7° to 7.2° C.). Also typically, the residence time of the chocolate-flavored composition in the swept-wall chocolate tempering unit is less than about 20 minutes. Preferably, the residence time in the tempering unit is in the range of from about 1 to about 8 minutes, more preferably 1 to about 6 minutes.

In a second stage of the dynamic tempering procedure used in this invention, the cooled confectionery composition is conditioned under shear agitation at a warmer temperature of from about 70° F. to about 85° F. (21.1° C. to 29.4° C.). More preferably, the composition is conditioned at a temperature of from about 70° F. to about 74° F. (21.1° C. to 23.3° C.). Generally the conditioning step lasts for from about 2 minutes to 8 minutes.

As in the cooling step, the conditioning step of the dynamic tempering procedure herein is carried out with the confectionery composition maintained under agitation. Generally, however, less shear agitation is needed during the conditioning step in comparison with that utilized during the cooling (nucleation) step. Thus, generally during the conditioning operation, shear agitation can be imparted to the confectionery composition to the extent of shear rates ranging from about 10 to about 8000 sec-1. The conditioning step of the dynamic tempering procedure is preferably carried out in the same heat exchanger used during the cooling step.

Various types of conventional apparatus may be used to carry out the two stages of the dynamic tempering operation employed in the process of this invention.

The cooling and conditioning of the flavored confection compositions can be carried out in any swept-wall, scraped-wall, or screw-type heat exchanger that is suitable for transferring the requisite amounts of thermal and mechanical energy. Examples of such heat exchangers include Votator and Girdler "A" units and a Groen Model # DR(C) used for margarine and shortening manufacture and Aasted chocolate tempering units. References to these conventional units include: Greenwell, B. A., *J. Amer. Oil Chem. Soc.*, March 1981, pp. 206–7; Haighton, A. J., *J. Amer. Oil Chem. Soc.*, 1976, Vol. 53, pp. 397–9; Wiedermann, L. H. *J. Amer. Oil Chem. Soc.*, Vol. 55, pp. 826–7; Beckett, S. T., editor, *Industrial Chocolate Manufacture and Use,* Van Nostrand Reinhold, New York, 1988, pp. 185–9. All of these publications are incorporated herein by reference.

A preferred piece of equipment for carrying out the cooling and conditioning steps of the dynamic tempering operation is a swept-wall chocolate tempering machine, such as a Sollich Turbo Temperer. Devices of this general type, as well as components thereof, are described more fully in Sollich, U.S. Pat. No. 4,059,047, Issued Nov. 22, 1977; Sollich U.S. Pat. No. 4,178,105, Issued Dec. 11, 1979; Blum, U.S. Pat. No. 4,648,315, Issued Mar. 10, 1987; and Sollich, U.S. Pat. No. 4,859,483, Issued Aug. 22, 1989. All of these patents are incorporated herein by reference.

Alternatively, the conditioning step can be carried out in a separate apparatus, including any agitated, jacketed vessel capable of being operated such that air can be excluded from incorporation into the flavored confectionery composition being processed therein and the temperature of the composition can be suitably controlled. An example of a suitable scraped-wall, jacketed, open tank mixer is a Krueter temper kettle (Beckeli, pp. 183–4). In addition, a "picker box" can be used for the conditioning step of the tempering operation. A picker box is also referred to as a Votator or Girdler "B" unit and is used extensively in the margarine and shortening industries. There are many references to this type of equipment, including Joynet, N. T., *J. Amer. Oil Chem. Soc.*, 1953, vol. 30, pp.526–535 and Schwitzer, M. K., *Margarine and Other Food Fats*, Interscience Publishers, New York, 1956, p. 287. These publications are also incorporated herein by reference. It is not preferred to use a separate vessel for carrying out the conditioning step since this requires extra process time.

In general, the time period required for cooling and conditioning in the tempering process described herein is significantly less than for prior tempering processes. This is because it has now been discovered that it is not necessary to form beta crystals during the tempering process itself. Instead, alpha crystals can be formed during tempering. These alpha crystals will then transform to beta during molding.

It is also possible to carry out both the cooling (nucleation) step and the conditioning step of the dynamic tempering procedure herein in a single piece of heat exchanger apparatus. For example, configuration of, conditions in and flow rates through a turbo temperer, e.g. a Sollich Turbo Tempering column, can be adjusted so that both the cooling and conditioning steps can take place within this device.

E. Setting Tempered Formulation

The dynamically tempered, fluid, chocolate-flavored mass is then ready for molding, extruding, depositing or enrobing applications. Molding, extruding and depositing applications include the formation of chocolate-flavored bars and chocolate chips, while enrobing applications include candy bars and cookies covered with a chocolate-flavored coating. In molded, deposited or extruded applications, the fluid chocolate-flavored mass is simply filled into the appropriate mold, deposited onto a flat surface such as a moving belt, or extruded into the desired configuration. In enrobing applications, the fluid chocolate-flavored mass is applied to the appropriate substrate such as a confectionery nougat center or cookie center using conventional enrobing equipment.

The tempered formulation is "set" or crystallized in a manner such that the reduced calorie cocoa butter substitute fat is transformed into a stable beta crystalline phase. The particular manner in which the formulation is set will depend upon the particular formulation involved and the particular finished product form desired. Generally, the formulation is set by cooling it in an environment having a temperature of about 70° F. (21.1° C.) or less, typically in the range of from about 38° F. to about 70° F. (3.3° to 21.1° C.), for at least about 5 minutes, typically in the range of from about 15 minutes to about 8 hours, preferably from about 15 minutes to about 3 hours, more preferably from about 15 minutes to 1 hour, and most preferably from about 15 minutes to about 30 minutes. (The in mould time for the chocolate confectionery composition of the present invention is typically less than that of prior chocolate confectionery compositions. This is because the MLM-enriched reduced calorie fats used in the confectionery compositions of the present invention crystallize more quickly into the beta phase than other reduced calorie fats.

Next, the formulation is demolded and wrapped or otherwise packaged, and then held in an environment having a temperature of at least about 60° F. (15.6° C.), typically in the range of from about 60° F. to about 70° F. (15.6° C. to 21.1° C.). The demolded pieces are then warmed under controlled relative humidity so as to prevent condensation on the pieces, and the pieces are then packaged in an environment having a temperature of about 65° F. (18.3° C.).

ANALYTICAL METHODS

A number of parameters used to characterize elements of the present invention are quantified by particular experimental analytical procedures. Each of these procedures is described in detail as follows:

1. Method for Measuring Level of Long Chain Fatty Acid 2-position Isomer Present in Reduced Calorie Fats This method is an application of high performance liquid chromatography (HPLC) using a reversed-phase column, non-aqueous eluent, and a laser light-scattering detector (LLSD) for the quantification of triglyceride positional isomers in the reduced calorie fats herein. The triglyceride peaks are separated by carbon number (molecular weight) and further resolved based on the position of the long chain fatty acid chain on the glycerol backbone. Thus each carbon number (CN) triglyceride appears as a doublet; the triglyceride with the long chain fatty acid in the middle (2-position) elutes prior to the triglyceride with the long chain fatty acid on the end (1,3-position). A high-efficiency column, low eluent flow rate, and subambient column temperature are needed for the separation of the isomers.

For quantification, reduced calorie fat samples are dissolved in isopropanol. Quantification is by area percent, normalized within a CN doublet.

APPARATUS

| | |
|---|---|
| Liquid Chromatograph | Hewlett-Packard 1090, equipped with a ChemStation |
| Detector | Varex ELSD II evaporative light-scattering detector, Varex Corp., Burtonsville, MD. |
| Data Collection | Hewlett-Packard ChemStation |
| Circulating Bath | Fisher Scientific Isotemp Refrigerated Circulator Model 910, Fisher Scientific, 9403 Kenwood Rd., Suit C-208, Cincinnati, OH |
| Column Jacket | Glass with Teflon ferrules, custom-built at Procter & Gamble Glass Shop (Note: jacket must be glass, not acrylic, to accommodate the propylene glycol in the circulating bath) |
| Vials | 1 mL with Teflon/silicone septa |
| Column | E. Merck, LiChroCART, Superspher 100 RP-18, 25 cm × 4 mm i.d., 3 micron spherical particles, EM Separations, 480 Democrat Rd., Gribbstown, NJ. |
| Vacuum Filter Assembly | 300 mL glass funnel, glass base filter support, stainless steel filter support screen, TFE support screen gasket, aluminum clamp, one liter vacuum flask |
| Filters | Rainin Nylon-66 membrane filters, 0.45 micron pore size, 47 mm diameter, #38–114, Rainin Instrument Co., Inc., Woburn, MA |
| Analytical Balance | Mettler HK 160 |
| Volumetric Flasks | 10 ML |
| Calculator | Texas Instrument TI-55 III |
| REAGENTS | |
| Isopropanol (IPA) | HPLC grade |

REFERENCE STANDARDS

A working reference material (WRM) is used to verify proper operation of this method. The WRM is a batch of reduced calorie fat which has been analyzed at least 4 times to establish the mean and standard deviation for quantification of each of the isomers. The WRM is analyzed daily. If the result on the WRM is equal to or within ±3 standard deviations of the known value, then the equipment, reagents and operations are performing satisfactorily. If the result on the reference standard is outside ±3 standard deviations of the known value, then a rerun of the reference standard is started immediately. If the result on the rerun is equal to or within 3 standard deviations of the known value, then the equipment, reagents and operations are performing satisfactorily. If the rerun is outside the ±3 standard deviations of the known value, then the sample results shall be rejected and troubleshooting procedures begun.

OPERATION

Standards

The WRM solution should be fleshly prepared daily.
Mobile Phases

The eluent is HPLC-grade isopropanol (IPA), which should be filtered through a 0.45 micron filter prior to use.
Instrumental Conditions
1. Eluent is IPA.
2. Initial flow rate is 0.05 mL/min. This is held for 180 minutes, then flow is ramped to 0.15 mL/min. over one minute. The 0.15 mL/min. flow rate is held for 28 minutes, then the flow is ramped back down to 0.05 mL/min. over one minute.
3. Column temperature is 0° C.
4. Injection size is 20 microliters.
5. Integration is begun at 122 minutes, using a peak width of 2.50, a threshold of −10 and area reject of 1. Note that the chromatogram may be integrated manually if the operator deems the integration using these parameters to be unsatisfactory.
6. Detector temperature is 133° C., nitrogen flow rate through detector is set to 34 mm.

Daily Operation
1. Degas the eluent for ten minutes with helium sparging prior to turning on the pumps. Allow the detector to warm up during the initial ten minute sparge.
2. After the detector is warmed up, start the nitrogen flow through it. Load the data acquisition parameters and start the pump so solvent is flowing at 0.05 mL/min.
3. Turn on the circulating bath and set temperature for 0° C. Allow the bath to reach 0° C., then allow the column to equilibrate at 0.05 mL/min. and 0° C. for at least 60 minutes.
4. Prepare the WRM as follows:
   a. Melt the sample in a warm water bath; stir to ensure homogeneity.
   b. Weigh the melted sample into a 10 mL volumetric flask so that the final concentration in isopropanol will be between 4.5 and 8.8 mg/mL. Record weight to fourth decimal place.
   c. Dissolve sample in isopropanol and dilute to volume with isopropanol.
5. Inject the WRM and check for proper operation of the method by comparing the reported results for this standard with established results of this method. If the reference standard is within ±3 standard deviations of the established results, then the samples can be run.

PROCEDURE

Sample Preparation

A. For reduced calorie fats containing the same number of major CN triglycerides as the WRM:
   Follow steps 4a–c for the preparation of the WRM.
B. For reduced calorie fats that are predominantly 1 carbon number:
   Follow steps 4a–c for the preparation of the WRM except weigh out enough sample so that the final concentration in isopropanol is between 2.5 and 4.0 mg/mL.
C. For reduced calorie fats containing large amounts of free medium chain fatty acids:
   For these samples, the approximate level of triglyceride in the sample must be known (as determined by another analytical method, such as a GC profile). Follow steps 4a–c for the preparation of the WRM except weigh enough of the homogeneous sample into the 10 mL volumetric flask so that the final concentration of triglyceride will be between 4.5 and 8.8 mg/mL. For example, if the sample contains only 20% triglyceride, then use five times as much sample as for a finished product reduced calorie fat sample.

WRM and Sample Analysis
1. Load the flow rate program described under "Instrumental Conditions" hereinabove.
2. Load the integration parameters described under "Instrumental Conditions" hereinabove.
3. Inject the WRM and the samples.

Quantification

Quantification is by area percent within each carbon number doublet. Use the peaks of the WRM to assign peak identities in the sample. The first two major peaks at retention times of approximately 137 and 142 minutes are the CN38 2-position and 1,3-position isomers, the third and fourth major peaks at approximately 156 and 164 minutes are the CN40 2-position and 1,3-position isomers, and the fifth and sixth peaks at approximate retention times of 182 and 189 minutes are the CN42 2-position and 1,3 position isomers, respectively. Due to retention time shifts caused by temperature fluctuation and column aging, peak assignments must be made using the daily WRM chromatogram.

A sample calculation is shown below:
To calculate the percent of the CN38 that is 2-position:

$$\% \text{ 2-position } CN38 = \frac{\text{area 2-position } CN38}{\text{area 2-position } CN38 + \text{area 1,3-position } CN38} \times 100\%$$

2. Carbon Number Profile

The carbon number profile (CNP) of the triglycerides (i.e. MML/MLM, MLL/LML, MMM and LLL) present in the reduced calorie fat can be determined by programmed temperature-gas chromatography (GC) using a short fused silica column coated with methyl silicone for analysis and characterization of the composition by molecular weight. The triglycerides are separated according to their respective carbon numbers, wherein the carbon number defines the total number of carbon atoms on the combined fatty acid residues. The carbon atoms on the glycerol molecule are not counted. Glycerides with the same carbon number will elute as the same peak. For example, a triglyceride composed of three $C_{16}$ (palmitic) fatty acid residues will co-elute with triglycerides made up of one $C_{14}$ (myristic), one $C_{16}$ and one $C_{18}$ (stearic) fatty acid residue or with a triglyceride composed of two $C_{14}$ fatty acid residues and one $C_{20}$ (arachidic)

fatty acid residue. See Kluesener et al; U.S. Pat. No. 5,142,071; Issued Aug. 25, 1992, which is incorporated by reference.

3. Fatty Acid Composition Principle

The fatty acid composition of the triglycerides comprising the reduced calorie fat of the present invention is measured by gas chromatography. First, fatty acid ethyl esters of the triglycerides are prepared by any standard method (e.g., by transesterification using sodium ethoxide), and then separated on a capillary column which is coated with DB-WAX stationary phase. The fatty acid ethyl esters are separated by chain length and degree of unsaturation. A split injection is made with flame ionization detection. Quantitation is performed by use of a double internal standard method. This method can separate fatty acid ethyl esters from $C_6$ to $C_{24}$.

Equipment

| | |
|---|---|
| Gas Chromatograph | Hewlett-Packard 5890, or equivalent, equipped with a split injector and flame ionization detector, Hewlett-Packard Co., Scientific Instruments Div., 1601-T California Ave., Palo Alto, CA 94304 |
| Autosampler Injector | Hewlett-Packard 7673A, or equivalent |
| Column | 15 m × 0.25 mm I.D., fused silica capillary column coated with DB-WAX (0.25 micron film thickness), Hewlett-Packard Co., Scientific Instruments Div. |
| Data System | Hewlett-Packard 3350, 3000-T Hanover St., Palo Alto, CA 94304 |
| Recorder | Kipp & Zonen, BD40, Kipp & Zonen |
| Reagent | |
| Hexane | Burdick & Jackson, or equivalent, American Scientific Products |

Reference Standards

Two reference standards are used each day of operation to verify proper operation of this method. 1) A reference mixture of fatty acid methyl esters (FAME) is used to check the operation of the instrument. This reference mixture has the following fatty acid composition: 1% $C_{14:0}$, 4% $C_{16:0}$, 3% $C_{18:0}$, 45% $C_{18:1}$, 15% $C_{18:2}$, 3% $C_{18:3}$, 3% $C_{20:0}$, 3% $C_{22:0}$, 20% $C_{22:1}$, and 3% $C_{24:0}$. 2) A reference standard of a commercial shortening is used to check the operation of the total system—ethylation and gas chromatographic analysis. The shortening reference standard has the following fatty acid composition: 0.5% $C_{14:0}$, 21.4% $C_{16:0}$, 9.2% $C_{18:0}$, 40.3% $C_{18:1}$, 23.0% $C_{18:2}$, 2.2% $C_{18:3}$, 0.4% $C_{10:0}$, 1.3% $C_{20:1}$, and 0.3% $C_{22:0}$.

The reference mixture of FAME should be diluted with hexane and then injected into the instrument. A new vial of FAME reference mixture should be opened every day since the highly unsaturated components, $C_{18:2}$ and $C_{18:3}$, oxidize easily. The shortening reference standard should be ethylated with the samples prior to their analysis by capillary gas chromatography. The results from the reference standards should be compared with the known values and a judgment made concerning the completed analysis. If the results of the reference standards are equal to or within ±3 standard deviations of the known values, then the equipment, reagents and operations are performing satisfactorily.

Operation

A. Instrumental Set-up

1. Install the column in the gas chromatograph, and set up the instrumental conditions as in Table 4.
2. Set up the data system with the appropriate method to acquire and analyze the data. The retention times may have to be adjusted in the method due to instrument variations. Consult the data system reference manual on how to do this—HP3350 User's Reference Manual. Unity response factors are used for each component.
3. Obtain the shortening reference standard for analysis with the samples and ethylate it with the samples.

TABLE 4

| INSTRUMENTAL CONDITIONS | |
|---|---|
| Instrument | Hewlett-Packard 5890 |
| Column | 15 m × 0.25 mm I.D., coated with DB-WAX, 0.25 u film thickness |
| Column head pressure | 12.5 psi |
| Carrier gas | Helium |
| Injector "A" temperature | 210° C. (410° F.) |
| Split vent flow | 100 mL/min. |
| Septum purge | 1.5 mL/min. |
| Oven temperature profile: | |
| Initial temperature | 100° C. (230° F.) |
| Initial time | 1 min. |
| Rate 1 | 15° C./min |
| Final temp 1 | 170° C. (338° F.) |
| Final time 1 | 0 min. |
| Rate 2 | 6° C./min |
| Final temp 2 | 200° C. (392° F.) |
| Final time 2 | 0 min. |
| Rate 3 | 10° C./min |
| Final temp 3 | 220° C. (428° F.) |
| Final time 3 | 8 min. |
| Detector | FID |
| Detector temp | 230° C. (446° F.) |
| Make-up gas | 30 mL/min. |
| Detector $H_2$ flow | 30 mL/min. |
| Detector air flow | 300 mL/min. |

B. Analysis of Samples—(The samples are analyzed with a double internal standard.)

1. Dilute the reference mixture of FAME with hexane. The methyl esters should be approximately 2% in hexane. Inject one microliter of this solution via the autosampler. The results must meet the criteria in the Reference Standards section.

2. Prepare the triglyceride samples to be analyzed by adding two different internal standards, $C_9$ and $C_{21}$ triglycerides. ($C_9$ and $C_{21}$ triglycerides are commercial standards consisting of 100% 9-carbon and 21-carbon triglycerides, respectively.) The internal standards are added to the samples at about 10% by weight of the sample. The samples (including the internal standards) are then converted to ethyl esters by any standard method.

3. Set up a sequence in the LAS data system to inject the samples.

4. Activate the autosampler to inject 1.0 microl. of the samples in the sequence. The gas chromatograph will automatically begin its temperature program and the data system will collect and analyze the data for the sequence.

5. The data is analyzed with the two internal standard procedure. The absolute amount (mg of esters per gram of sample) of the $C_6$ through $C_{16}$ components is calculated from the $C_9$ internal standard. The absolute amount of the $C_{18}$, $C_{20}$, $C_{22}$ and $C_{24}$ components is calculated from the $C_{21}$ internal standard. Weight percentages of fatty acids are calculated from these amounts.

4. Melting Point of Reduced Calorie Fat

Apparatus

| | |
|---|---|
| Differential Scanning Calorimeter (DSC) | Perkin-Elmer (Norwalk, CT) DSC-4 |
| Straight-side aluminum sample pans and lids | Perkin-Elmer |
| 10 ml glass vials with Teflon lined caps | |
| Balance | Analytical, micro-balance able to weigh ± 0.005 mg |
| Thermometer | |
| Hot water bath | 140° to 180° (60° C. to 82° C.) |
| 50% water/50% ice bath | |
| Constant temperature chambers at 38° F. and 70° F. (3.3° C. and 21.1° C.) | |
| Reagents | |
| Indium reference standard | Perkin-Elmer |
| Distilled water | |

The calibration of the DSC is checked before each sample is analyzed. The onset temperature of the Indium reference standard shall be compared with its known onset temperature to verify that apparatus and procedures are performing satisfactorily. If the DSC is found to be out of calibration by more than ±0.5° C., it shall be recalibrated. The DSC is recalibrated using the appropriate procedures described in the DSC Operating Manual, using the Indium and the water reference materials.

Procedure:

1. Melt sample until clear on a hot water bath, and place 2–3 grams into a 10 ml glass vial.
2. Heat sample (after adjusting hot water bath to 145° F. ±2° F. [62.8° C. ±1° C.]), hold at 145° F. for 30±5 minutes.
3. Quick chill by immersing vial in water/ice bath, hold for 15±2 minutes.
4. Place vial in 38° F. (3.3° C.) chamber, hold 48±4 hours.
5. Transfer vial to 70° F. (21° C.) chamber, hold 48±4 hours.
6. Run the sample on a Perkin-Elmer DSC-4 as follows:

| Conditions: | |
|---|---|
| Sample weight | 5.00 mg (±0.10 mg) |
| Scan rate | 2.5° C./min. for sample. |
| | 10° C./min. for refer. std. |
| Temperature range | −20 to 50° C. for sample. |
| | 150 to 165° C. for refer. std. |
| Hold time @ load temperature | 5 minutes |
| Sample pan and lid | Perkin-Elmer Straight-side |

7. Analyze the melting curve by first normalizing the thermogram. After normalizing, bracket the peak 1) at or just below the point of baseline deviation and below 10° C. and 2) at or just above the point at which the thermogram returns to the baseline and above 38° C. Draw the % solids curve.
8. Determine the % solids at 10° C., 21.1° C., 26.7° C., 33.3° C. and 37.8° C.
9. Record the complete melt point as the temperature at which the % solids curve returns to the baseline.

5. Rate of Crystallization into Beta Phase

This method is used to calculate the rate of crystallization of a reduced calorie fat sample into beta form. X-ray diffraction techniques are commonly used to Characterize crystalline polymorphs in triglycerides. When fat crystals are analyzed by x-ray, two types of spacing data can be collected. Long spacing data is observed in the $2\theta$ range from 1°–15° (89 to 5.9 Å) and short spacing data in the $2\theta$ range from 16°–27° (5.5 to 3.3 Å). The long spacing data correspond to the planes formed by the methyl end groups of the triglycerides and are dependent on chain length and angle of tilt of the molecule. Short spacings refer to the cross-sectional packing of the hydrocarbon chains. Short spacings are commonly used to characterize the polymorphic/forms of fats.

X-ray diffraction analyses are made with a Philips XRG3100 unit (Philips Electronic Instruments, Mahwah, N.J.). It is operated at 40 kV/35 mA with monochromatic copper $K\alpha_1$ radiation as the x-ray source. This unit is interfaced with a Theta.XRD automation system form Dapple Systems, Sunnyvale, Calif., that provides stepping motor control of the two theta angle and a data processing microcomputer system.

Reduced calorie fat samples are melted and held at 140° F. (60° C.) for one hour to remove any traces of crystal memory. Empty 1.5×1.5 inch stainless steel sample holders are equilibrated at the initial tempering temperature for the reduced calorie fat samples (usually 42° F.) in the constant temperature room. The melted reduced calorie fat samples are pipetted into the sample holders. The samples are retained in the sample holders by a Scotch tape backing. A 22×22 mm microscope coverglass can be placed on the back of the holder between the tape and the sample if the sample is particularly soft. This technique can also be used to protect samples from tape contamination when samples in limited supply need to be retained after x-ray analysis.

The samples are then quickly cooled to 42° F. by transferring the samples to a 42° F. constant temperature room. The surface of the sample is smoothed/leveled so that it is even with the face of the sample holder. It is convenient to use the edge of a glass microscope slide to level the surface. The sample is held at 42° F. for one hour, and then moved to a 70° F. constant temperature room.

The samples are monitored for beta growth. X-ray diffraction data is collected at regular time intervals. (To minimize the amount of temperature change in the tempered samples, they are transported in an insulated box from the temperature storage to the x-ray unit). The amount of beta was determined from peak area at 4.54 angstroms. Short spacing data is quickly collected by scanning from 17 to 25° $2\theta$ at 0.05 step increments with 1 second hold times. For long spacing data, samples are scanned from 1.45 to 30° $2\theta$ with 0.025 step increments and 1 second hold times.

EXAMPLES

The following are specific illustrations of the improved process in accordance with the present invention:

Example 1

A reduced calorie flavored confectionery composition is prepared using the following ingredients:

| | Ingredients |
|---|---|
| chocolate liquor (52% cocoa butter) | 0.30 parts |
| cocoa powder (11% cocoa butter) | 7.10 parts |
| whole fat milk solids (26% butterfat) | 3.30 parts |

| Ingredients | |
| --- | --- |
| nonfat milk solids (0.8% butterfat) | 8.30 parts |
| ethyl vanillin | 0.05 parts |
| soy lecithin | 0.2 parts |
| reduced calorie confectionery fat | 29.04 parts |
| sucrose | 51.71 parts |

The reduced calorie confectionery fat ingredient is prepared by esterifying monobehenin with caprylic and captic fatty acids as follows:

$C_{10:0}$ (P&G $C_{1095}$) fatty acid is redistilled to improve color, odor and reduce unsaponifiable levels. The $C_{10:0}$ acid is distilled at 170°–190° C. under vacuum and condensed at 40° C. An 80% middle-cut fraction of the distillate yielded a 97.5% pure $C_{10:0}$ fatty acid feedstock. $C_{8:0}$ (P&G $C_{895}$) fatty acid of 97.7% purity is also used.

A selective esterification reaction is made in a pilot plant reaction system. The reactor consists of a hot oil heated 200 liter vessel having a variable speed agitator (3.14 cm diameter), no internal baffles, and a gas dispersion ring connected to an external nitrogen source directly below the agitator. A partial condenser consisting of a reflux column (1.96 cm diameter.times.22.04 cm length) packed with metal wire mesh and a horizontal condenser are connected to the top of the reactor vessel. Total condenser capability is provided by a separate condenser/distillate trap.

Typically, about 118 kg of a mixture of $C_{10:0}$ and $C_{8:0}$ fatty acids (55:45 weight ratio) is preheated to the esterification temperature and adjusted to the requisite pressure. This fatty acid mixture is used to esterify about 16.8 kg of monobehenin at an 18:1 acid to monobehenin mole ratio at esterification temperature 245° C. (The monobehenin is commercially produced by molecular distillation of behenic acid/glycerol reaction products and comprises 98.1% monoglyceride, 0.5% diglyceride, 0.1% free glycerol, and 0.3% diglycerol.) The monobehenin is added incrementally as a liquid over a 60 minute period to the melted fatty acids. The esterification pressure ranges from 700 mmHg to 1520 mmHg. A pressure of 700 mmHg is initially used, but is increased as necessary to prevent the mixture containing the fatty acids from boiling over.

Vigorous agitation (571 m./min. tip speed) and a nitrogen gas sparging rate of 1.4–2.1 liter/min. per liter of reaction mixture is used to remove the water generated during the esterification. The light fatty acids are refluxed by the partial condenser operated at 110° C., while generated water is condensed by the total condenser at 40° C. The esterification progress is monitored by thin layer chromatography (TLC) using high performance silica plates and a 75 part petroleum ether/25 part diethyl ether/1 part acetic acid development solvent, followed by charring with 5% phosphomolybdic acid in anhydrous methanol. The esterifications are stopped after complete elimination of diglycerides (i.e. measured level typically less than 0.4%).

Analyses of the reaction mixture after the esterification reaction indicates a 6% MMM, 91.3% MML/MLM and 2.7% MLL/LML triglyceride composition (average) in the reaction mixture. (As determined by CNP (acid free basis), "MMM" $C_{24}$ to $C_{34}$, "MML/MLM"=$C_{36}$ to $C_{44}$, and "MLL/LML" $C_{46}$ to $C_{56}$.)

Residual fatty acids are vacuum distilled from the reaction mixture in a Pfaudler 15 wiped-film distillation unit. Typical residual fatty acid levels are 78% (as oleic) at the start of the distillation. The stripping temperatures range from 169°–202° C. with vacuum levels of 2 to 50 mm Hg. Distillation is stopped when the residual fatty acids are reduced to less than about 5%. The stripped batch is cooled to 100° C. by an external heat exchanger. Analysis of the stripped batch indicates a 6.0% MMM, 91.3% MML/MLM and 2.7% MLL/LML triglyceride composition (average), which suggests excellent thermal stability for the reaction mixture. The fatty acid composition of the stripped batch is as follows: 1% $C_{6:0}$, 48% combined $C_{8:0}$ and $C_{10:0}$, <1% $C_{12:0}$, <1% $C_{14:0}$, 0.7% $C_{16:0}$, 0.8% $C_{20:0}$, 48% $C_{22:0}$, and <1% $C_{24:0}$ fatty acids (average).

The stripped batch is decolorized by addition of 3% Filtrol® 105 bleaching earth/0.3% Norit® 2203 activated carbon. The slurry &bleaching agents and stripped oil is heated at 75° C. for 3 hours prior to the addition of diatomaceous filter earth. The mixture is filtered through a plate and frame filter press, and yields a clear oil. Analysis of the bleached product indicates a 6.0% MMM, 91.3% MML/MLM and 2.7% MLL/LML triglyceride composition (average), and 5% free fatty acids (as oleic).

The residual fatty acids and MMM triglycerides are removed by molecular distillation on a KD-10 unit (UIC, Inc.). The stripped batches are fed to the unit at a 6 kg./hr. feed rate and a portion thereof is distilled at 8 microns pressure and a 200° C. wall jacket temperature. Under these conditions, a 15% distillate cut is made which removes all residual fatty acids and most MMM triglycerides. Composite analysis of the molecular still residue indicated a 2.0% MMM, 95.0% MML/MLM and 3.0% MLL/LML triglycerides composition (average). The level of unsaponifiables is 1% in the reaction mixture. A second cut is done to reduce the level of MMM triglycerides to less than 1%.

The residue from the distillation is passed through a KD-10 molecular still to separate the desired MML/MLM triglycerides from the MLL/LML triglycerides and residual color/unsaponifiables. A feed rate of 6 kg./hr. and a 250° C. wall jacket temperature at 4 microns pressure is used to distill off the desired MML/MLM triglycerides. An 85% cut is taken.

Analyses of the distillate indicates a 1.5% MMM, 43.1% MML, 54.8%MLM (97.9% combined MML and MLM triglycerides) and 0.6% MML/LML triglyceride composition (average). The level of unsaponifiables is 0.25% in the distilled product which suggests good separation of these components by molecular distillation. The melting point of the triglyceride mixture is 29° C. 56% of the triglycerides having a carbon number of 42 are MLM triglycerides.

The distilled MML/MLM triglycerides are then deodorized at 205° C. for 3 hours at a pressure of 1–2 mmHg with a 1.0% steam rate. The distilled, bleached and deodorized MML/MLM triglycerides are clear in color, odor-free and bland in taste. Follow-up evaluations in chocolate-flavored products indicate good utility as a cocoa butter replacer. This blend crystallizes into beta form within about 1 hour. Overall yield of purified MML/MLM triglycerides is 65% based on the initial amount of monobehenin.

To make a reduced calorie flavored confectionery composition from the above ingredients:

1. Mix the dry ingredients (cocoa powder, whole milk solids, nonfat dry milk solids, ethyl vanillin, sucrose) at low speed.
2. Add melted chocolate liquor to the dry ingredients. Continue to mix at low speed.
3. Add 23.5 parts of the reduced calorie confectionery fat (previously melted) to the mixture. Continue mixing at the low speed until all of the ingredients are well blended.

4. Refine the mixture with a roll-mill.
5. Weight out 83.4 parts of the amount of mix recovered from the mill. Dry-conch at 140°–145° F. (60°–62.8° C.) for 2.5 to 3 hours at medium speed.
6. Add 5.54 parts of melted reduced calorie confectionery fat to the dry-conched mix. Add the soy lecithin. Mix well. Reduce the temperature to 120°–125° F. (48.9°–51.7° C.). Reduce the mixer speed to low and continue wet-conching overnight (16 to 20 hours). With these ingredients and procedure, a reduced calorie flavored confectionery composition with the following position is prepared:

|  | Composition |
| --- | --- |
| chocolate liquor (52% cocoa butter) | 0.3% |
| cocoa powder (11% cocoa butter) | 7.1% |
| whole fat milk solids (26% butterfat) | 3.3% |
| nonfat milk solids (0.8% butterfat) | 8.3% |
| ethyl vanillin | 0.05% |
| soy lecithin | 0.2% |
| reduced calorie confectionery fat | 29.04% |
| sucrose | 51.71% |

A Sollich MSV200B tempering column consisting of a vertically arranged column of six swept-wall heat exchanger plates is used to cool the wet-conched reduced calorie confectionery composition from melt at 140° F. (60° C.) to about 70° F. (21.1° C.). The composition, flowing from the bottom to the top of the tempering column at flow rate of 220 lbs./hour to give a residence time of 8 minutes, is mixed at 50 rpm (maximum shear rate of about 4000 sec-1) while being cooled at a rate of 25° F./min. (13.9° C./min.). The coolant temperatures are 45° F. on the remaining four heat exchanger plates. Within the Sollich tempering column, low-melting fat crystal nuclei are formed in the reduced calorie flavored confectionery composition.

For molding, samples in molds are cooled for 30–90 minutes at 65° F. (18.3° C.) under a fan (run at about 2 m/s), demolded manually, and packed at 65° F. (18.3° C.) while retaining good gloss. For enrobing, coated centers are cooled for 45 minutes at 65° F. (18.3° C.) or for 15 minutes at 60° F. (15.6° C.) under a fan (run at about 2 m then are hard enough to pack at 65° F. (18.3° C.). All of the reduced calorie flavored confectionery compositions are bloom free after dynamic tempering and will not bloom after exposure to 90° F. (32.2° C.) for 90 minutes or after five 24-hour cycles of 86° F. (30.0° C.) for 8 hours and 70° F. (21.1° C.) for 16 hours.

Using a reduced calorie flavored confectionery composition prepared as described in Example 1, the Sollich is run at a faster flow rate, giving a much lower residence time of 4 minutes.

The wet conched reduced calorie flavored confectionery composition is cooled from melt at 140° F. (60° C.) to about 70° F. (21.1° C.) at a rate of 25° F./min. (13.9° C./min.) in the Sollich tempering column mixing at 50 rpm (maximum shear rate of about 4000 sec-1). To lower the reduced calorie flavored confectionery composition temperature, all six plates in the column are cooled with water circulating at 60° F. (15.6° C.). The reduced calorie flavored confectionery composition exiting the Sollich has a very low viscosity.

The samples in the molds are cooled for 90 minutes at 65° F. (18.3° C.) or 70° F. (21.1° C.) under a fan (run at about 2 m/s), demolded manually, and packed at 65° F. (18.3° C.) while retaining good gloss. After cooling for 45 minutes at 65° F. (18.3° C.) or for 15 minutes at 60° F. (15.6° C.) under a fan (run at about 2 m/s), enrobed centers are hard enough to pack 65° F. (18.3° C.). All of the reduced calorie flavored confectionery compositions are bloom free after dynamic tempering and will pass both thermal stress tests mentioned in Example 1.

Example 3

A temperable reduced calorie flavored confectionery composition is made according to the general formulation and procedure described in Example 1.

From melt at 140° F. (60° C.) the reduced calorie flavored confectionery composition is then cooled by a series of six swept wall heat exchanger plates (the Sollich Turbo temperer). Operating with an 18 minutes residence time and at 50 rpm (maximum shear rate of about 4000 sec-1), the Sollich Turbo tempering column cools the reduced calorie flavored confectionery composition at a rate of 25° F./min. (13.9° C./min.) to 68° F. (20.0° C.) in the first two plates chilled with 20° F. (−6.7° C.) water. In the next four plates, the Sollich warms the reduced calorie flavored confectionery composition to 73° F. (22.8° C.). The final four plates are used to condition the flavored confectionery composition. The coolant temperature is 68° F.

After cooling in molds for about 90 minutes at 65° F. (18.3° C.) under a fan (run at about 2 m/s), the reduced calorie flavored confectionery product transforms sufficiently to its stable beta phase to be demolded manually under a fan (run at about 2 m/s) with good gloss. All samples are without bloom and will pass both thermal stress tests mentioned in Example 1.

What is claimed is:

1. A process for preparing a bloom-stable, flavored confectionery composition which contains reduced calorie fat in the stable beta phase, which process comprises:

(I) forming a temperable, flavored confectionery composition which comprises:
   A) a flavor enhancing amount of a flavor component;
   B) from about 15% to about 45% of a fat component comprising:
      (i) at least about 70% by weight of the fat component of a reduced calorie cocoa butter substitute fat having:
         (a) at least about 40% by weight of the reduced calorie fat MLM triglycerides;
         (b) at least about 85% by weight of the reduced calorie fat combined MLM and MML triglycerides;
         (c) no more than about 5% by weight of the reduced calorie fat combined LLM and LML triglycerides;
         (d) no more than about 4% by weight of the reduced calorie fat of MMM triglycerides;
         (e) no more than about 2% by weight LLL triglycerides; and
         (f) no more than about 6% by weight of other triglycerides;
      wherein in said triglycerides M is a $C_6$ to $C_{10}$ saturated fatty acid residue and L is a $C_{17}$ to $C_{26}$ saturated fatty acid residue; and wherein said triglycerides are further characterized by having a fatty acid composition which comprises
         (x) from about 35% to about 60% combined $C_8$ and $C_{10}$ saturated fatty acids,
         (y) a ratio of $C_8$ to $C_{10}$ saturated fatty acids of from about 1:5 to about 25:1,
         (z) from about 35% to about 60% behenic fatty acid;

(ii) up to about 20% by weight of the fat component of milkfat;

(iii) up to about 20% by weight of the fat component of cocoa butter; and (iv) no more than about 4% by weight of the fat component of diglycerides; and C) from about 55% to about 85% other nonfat confectionery ingredients;

(II) dynamically tempering the flavored confectionery composition of Step (I) by cooling said composition from a non-crystalline state to a temperature of less than about 21.1° C. at a rate of from about 0.4° C./min. to about 83° C./min. while simultaneously working said composition to impart shear agitation thereto to the extent of shear rates ranging from about 400 to about 8000 sec-1, and by thereafter conditioning said composition for at least about 2 minutes by agitating and warming said composition to a temperature of from about 21.1° C. to about 29.4° C.; and thereafter (III) setting the tempered composition by cooling and/or warming the tempered composition from Step (II) in a manner such that the reduced calorie fat transforms into a stable beta crystalline phase.

2. A process according to claim 1 wherein the composition of Step (I) comprises from about 0.1% to about 25% of a chocolate flavor component.

3. A process according to claim 2 wherein in tempering Step (II) the chocolate-flavored confectionery composition is cooled from the non-crystalline state to a temperature of from about 12.8° C. to about 21.1° C., in a period of from about 4 to about 8 minutes while working said composition by imparting shear agitation thereto to the extent of shear rates ranging from about 500 to about 6000 sec-1.

4. A process according to claim 3 wherein in tempering Step (II) the cooling and subsequent conditioning of the agitated chocolate-flavored confectionery composition are carried out in one or more swept-wall, scraped-wall, or screw-type heat exchangers.

5. A process according to claim 4 wherein in Step (II) the cooling and conditioning steps are carried out in different zones of the same heat exchanger.

6. A process according to claim 5 wherein the heat exchanger employed in carrying out the Step (II) cooling and conditioning steps is a swept-wall tempering unit.

7. A process according to claim 3 wherein in the chocolate-flavored confectionery composition of Step (I) the fat component comprises:

(1) at least about 75% of a reduced calorie fat having:
  (a) at least about 45% by weight MLM triglycerides;
  (b) at least about 90% by weight of combined MLM and MML triglycerides;
  (c) no more than about 3% by weight of combined LLM and LML triglycerides;
  (d) no more than about 2% by weight of MMM triglycerides; and
  (e) no more than about 1% by weight LLL triglycerides; and
  (f) no more than about 4% by weight of other triglycerides;

and wherein said triglycerides are further characterized by having a fatty acid composition which comprises
  (x) from about 40% to about 60% combined $C_8$ and $C_{10}$ saturated fatty acids,
  (y) a ratio of $C_8$ to $C_{10}$ saturated fatty acids of from about 1:3 to about 19:1, and
  (z) from about 40% to about 60% behenic acid;

(2) up to about 14% by weight of the fat component of milkfat;

(3) up to about 14% by weight of the fat component of cocoa butter; and (4) no more than about 2% by weight of the fat component of diglycerides.

8. A process according to claim 7 wherein in the chocolate-flavored confectionery composition of Step (I) the triglycerides forming the reduced calorie fat are characterized by a fatty acid composition which comprises no more than about 10% $C_6$ saturated fatty acid, no more than about 10% $C_{20}$ saturated fatty acid, no more than about 4% $C_{24}$ saturated fatty acid, and no more than about 9% other fatty acids.

9. A process according to claim 8 wherein in the chocolate-flavored confectionery composition of Step (I) the nonfat confectionery ingredients comprise from about 35% to about 60% sugars, sugar alcohols, reduced-calorie sweeteners, and/or partially digestible or nondigestible carbohydrate bulking or bodying agents.

10. A process according to claim 9 wherein the nonfat confectionery ingredients of the Step (I) confectionery composition also include up to about 1.5% emulsifiers.

11. A process according to claim 10 wherein the nonfat confectionery ingredients of the Step (I) confectionery composition also include up to about 20% milk solids.

12. A process for preparing a bloom-stable, chocolate-flavored confectionery composition which contains reduced calorie fat in the stable beta phase, which process comprises:

(1) forming a temperable chocolate-flavored confectionery composition which comprises:

A) from about 0.1% to about 25% of a chocolate flavor component;

B) from about 15% to about 45% of a fat component comprising:
  (i) at least about 80% by weight of the fat component of a reduced calorie fat having:
    (a) at least about 60% by weight of the reduced calorie fat MLM triglycerides;
    (b) at least about 94% by weight of the reduced calorie fat of combined MLM and MML triglycerides;
    (c) no more than about 1.0% by weight of the reduced calorie fat of combined LLM and LML triglycerides;
    (d) no more than about 1% by weight of the reduced calorie fat of MMM triglycerides;
    (e) no more than 1% by weight of the reduced calorie fat of LLL triglycerides; and
    (f) no more than about 2% by weight of the substitute fat of other triglycerides;

wherein in said triglycerides M is a $C_6$ to $C_{10}$ saturated fatty acid residue and L is a $C_{17}$ to $C_{26}$ saturated fatty acid residue; and wherein said triglycerides are further characterized by having a fatty acid composition which comprises
  (x) from about 45% to about 55% combined $C_8$ and $C_{10}$ saturated fatty acids,
  (y) a ratio of $C_8$ to $C_{10}$ saturated fatty acids of from about 1:2 to about 2:1, and
  (z) from about 40% to about 50% behenic fatty acid;

(ii) up to about 14% by weight of the fat component of milkfat;

(iii) up to about 14% by weight of the fat component of cocoa butter; and (iv) no more than about 1% by weight of the fat component of diglycerides; and C) from about 55% to about 85% other nonfat confectionery ingredients;

(2) dynamically tempering the chocolate-flavored composition of Step (1) by cooling said composition from a non-crystalline state to a temperature of from about 12.8° C. to about 21.1° C. in a period of from about 4 to about 8 minutes while simultaneously working said composition to impart shear agitation thereto to the extent of shear rates ranging from about 500 to about 6000 sec-1, and by thereafter conditioning said composition for at least about 2 minutes by agitating and warming said composition to a temperature of from about 21.1° C. to about 29.4° C.; and thereafter (3) setting the tempered chocolate-flavored composition by cooling and/or warming the tempered composition from Step (2) in a manner such that the reduced calorie fat transforms into a stable beta crystalline phase.

13. A process according to claim 12 wherein in the chocolate-flavored confectionery composition of Step (1) the triglycerides forming the reduced calorie fat are characterized by a fatty acid composition which comprises no more than about 5% $C_6$ saturated fatty acid, no more than about 6% $C_{20}$ saturated fatty acid, no more than about 2% $C_{24}$ saturated fatty acid, and no more than about 5% other fatty acids.

14. A process according to claim 13 wherein in the tempering Step (2) the cooling of the chocolate-flavored confectionery composition is carried out in one or more swept-wall, scraped-wall, or screw-type heat exchangers.

15. A process according to claim 14 wherein in the tempering Step (2) the cooling of the chocolate-flavored confectionery composition is carried out in a heat exchanger of the Sollich Turbo Temperer, Aasted tempering unit, Votator "A" unit, Girdler "A" unit, or Groen Model #DR(C) type.

16. A bloom-stable, chocolate-flavored confectionery composition which contains reduced calorie fat in the stable beta crystalline phase, which composition comprises the tempered, set composition prepared by a process according to claim 7.

17. A bloom-stable, flavored confectionery composition which contains reduced calorie fat in the stable beta crystalline phase, which composition comprises the tempered, set composition prepared by a process according to claim 1.

18. A process for preparing a bloom-stable, flavored confectionery composition which contains reduced calorie fat in the stable beta phase, which process comprises:

(I) forming a temperable, flavored confectionery composition which comprises:

A) a flavor enhancing amount of a flavor component;
B) from about 15 parts to about 45 parts of a fat component comprising:
  (i) at least about 70% by weight of the fat component of a reduced calorie cocoa butter substitute fat having:
    (a) at least about 85% of a mixture of MLM and MML triglyceride isomers by weight of the reduced calorie fat (i);
    (b) said (a) having more than 40% said MLM triglyceride isomers by weight of said (a) mixture;
    (c) no more than about 5% by weight of the reduced calorie fat (i) combined LLM and LML triglycerides;
    (d) no more than about 4% by weight of the reduced calorie fat (i) of MMM triglycerides;
    (e) no more than about 2% by weight LLL triglycerides; and
    (f) no more than about 6% by weight of other triglycerides;

wherein in said triglycerides M is a $C_6$ to $C_{10}$ saturated fatty acid residue and L is a $C_{17}$ to $C_{26}$ saturated fatty acid residue; and wherein said triglycerides are further characterized by having a fatty acid composition which comprises (x) from about 35% to about 60% combined $C_8$ and $C_{10}$ saturated fatty acids,
(y) a ratio of $C_8$ to $C_{10}$ saturated fatty acids of from about 1:5 to about 25:1,
(z) from about 35% to about 60% behenic fatty acid;

(ii) up to about 20% by weight of the fat component of milkfat;
(iii) up to about 20% by weight of the fat component of cocoa butter; and
(iv) no more than about 4% by weight of the fat component of diglycerides; and C) from about 55 parts to about 85 parts other nonfat confectionery ingredients;

(II) dynamically tempering the flavored confectionery composition of Step (I) by cooling said composition from a non-crystalline state to a temperature of less than about 21.1° C. at a rate of from about 0.4° C./min. to about 83° C./min. while simultaneously working said composition to impart shear agitation thereto to the extent of shear rates ranging from about 400 to about 8000 sec-1, and by thereafter conditioning said composition for at least about 2 minutes by agitating and warming said composition to a temperature of from about 21.1° C. to about 29.4° C.; and thereafter (III) setting the tempered composition by cooling and/or warming the tempered composition from Step (II) in a manner such that the reduced calorie fat (i) transforms into a stable beta crystalline phase.

* * * * *